Patented Mar. 11, 1952

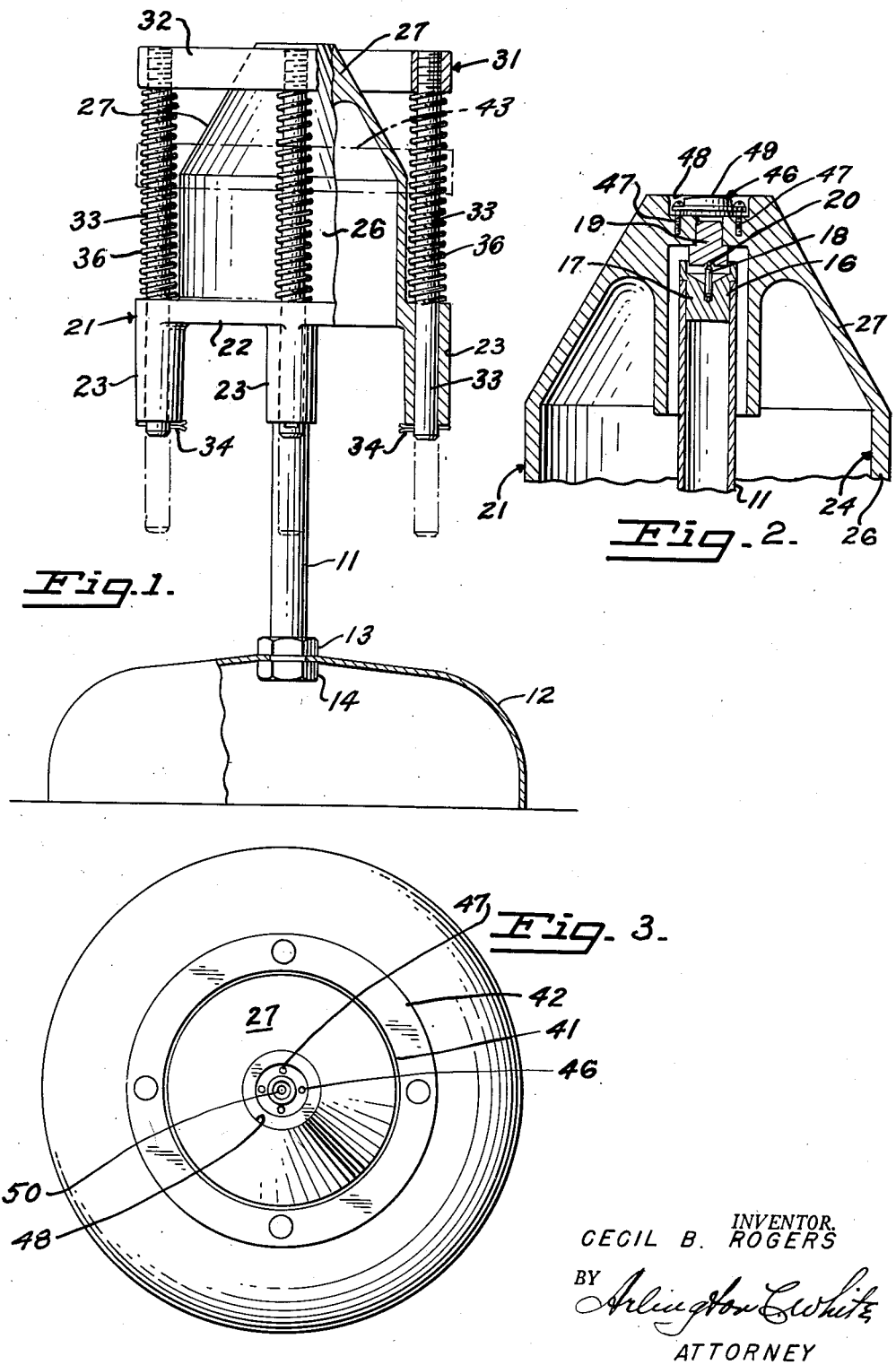

2,588,766

UNITED STATES PATENT OFFICE 2,588,766

AUTOMOBILE WHEEL BALANCER

Cecil B. Rogers, Berkeley, Calif.

Application June 10, 1949, Serial No. 98,208

1 Claim. (Cl. 73—66)

The invention, in general, relates to devices for effecting the balance of automobile wheels and more particularly relates to an improved balancer which affords speedily and readily an indication of the extent of out of balance of any given automobile wheel whereby the wheel can quickly be placed in static as well as dynamic balance in a minimum of time and with a minimum of labor.

Heretofore, there has been marketed several different types of automobile wheel balancers which, in the main, are of complex construction and somewhat cumbersome to manipulate and operate. The majority of prior wheel balancers have been devised for effecting so-called dynamic balance of the wheel and these devices primarily are operated by driving the automobile wheel placed thereon at high speeds or high number of revolutions per minute. The present invention is directed to simplicity of construction and economical production of an effective automobile wheel balancer which obviates inherent disadvantages of prior devices of this type.

A primary object of the present invention is to provide an improved automobile wheel balancer which affords effective balancing of an automobile wheel in a minimum of time and with a minimum of labor, as well as in a minimum of space.

Another important object of the present invention is to provide an improved balancer of the indicated nature which is additionally characterized by its simplicity of construction and operation whereby the same can be handled by the unskilled as well as the skilled with the same efficacious results.

A still further object of the invention is to provide an improved automobile wheel balancer of the aforementioned character which has a minimum number of parts, which requires no driven members or actuation by extrinsic devices, and which can be manufactured at a relatively low cost.

Other objects of the invention, together with some of the advantageous features thereof, will appear from the following description of a preferred embodiment of my invention which is illustrated in the accompanying drawings. It is to be understood, however, that I am not to be limited to the precise embodiment shown, nor to the precise arrangement of the various parts thereof, as my invention, as defined in the appended claim, can be embodied in a plurality and variety of forms.

Referring to the drawings:

Fig. 1 is a front elevational view, partly in section, of a preferred embodiment of the invention, this view showing in dotted lines, the lowered position of the frame when carrying a wheel to be balanced.

Fig. 2 is a fragmentary sectional elevational view of the wheel supporting cone of the preferred embodiment of the invention.

Fig. 3 is a top plan view of the preferred embodiment of the present invention with an automobile wheel mounted thereon.

In its preferred form, the improved automobile wheel balancer of my present invention preferably comprises a standard, a base frame movably mounted on said standard with its uppermost plane normal to said standard and disposed horizontal with no load thereon, together with a visual spirit level carried by said base frame for indicating the balanced and unbalanced states of said base frame with respect to the horizontal, and an auxiliary frame vertically movable with respect to said base frame; said auxiliary frame being adapted to receive an automobile wheel and to support the wheel with the inner periphery of the hub of the wheel resting on said base frame.

As particularly illustrated in Fig. 1 of the annexed drawings, I provide a standard 11 which preferably is provided with exterior threads on one extremity thereof in order that the same may be screw threaded into detachable engagement with a base 12 by means of suitable lock-nuts 13 and 14; this detachable mounting of the standard 11 on the base 12 affording vertical disposition of the standard 11 with respect to the base 12. Preferably the standard 11 consists of a hollow rod of circular cross-section, as shown, and I conveniently provide, in the upper extremity of the standard 11, a needle bearing 16 consisting of a block 17 which is press-fitted within the rod or standard 11 below the top thereof, and a needle or pin 18 which is press-fitted into the block 17 of the needle bearing, as especially illustrated in Fig. 2 of the accompanying drawings. Movably mounted upon the needle bearing 16 by means of a bearing block 19 having a recess 20 therein for receiving the needle or pin 18 of the needle bearing is a base frame, generally designated by the reference numeral 21. The base frame 21 preferably is fabricated of aluminum or other light-weight but durable metal and preferably is a single casting including a base member or annular flange 22 formed with a plurality of depending sockets 23, together with a body portion 24 which is divided into a generally cylindrical portion 26 and a truncated-cone portion 27, as clearly shown in Figs. 1 and 2 of the drawings. It is to be understood that the body portion of the base frame is integral with the base plate and depending sockets thereof.

In accordance with my invention an auxiliary frame 31 is movable mounted on base frame 21 and arranged for lowering and raising in relation to the uppermost plane of the truncated cone 27 of the base frame. To this end, the auxiliary frame 31 consists of an annulus 32 provided with a plurality of threaded openings therein arranged at 90° intervals about the annulus 32 and in which are received rods 33 having their upper extremities threaded for securely fastening the rods in operative position at 90° intervals apart to the annulus 32, as clearly shown in Fig. 1 of the accompanying drawings. The auxiliary frame 31 is mounted upon the base frame 21 by passing the lower extremities of each of the rods 33 through openings provided in the base plate 22 of the base frame 21, as well as into the sockets 23 of the base frame. The four rods 33 are held in operative position on the base frame 21 by means of cotter-pins 34 which pierce the lower ends of the rods 33. In addition to the foregoing elements, my improved automobile wheel balancer includes a plurality of compression springs 36, of which there are four in number and each being coiled about one of the rods 33 and confined between the annulus 32 and the base plate 22 of the base frame. Since all of the rods 33 are of the same length and also all of the compression springs 36 are of the same length, the auxiliary frame 31 is supported on the base frame 21 with the annulus 32 of the auxiliary frame maintained horizontal and its upper surface in the same plane as the uppermost plane of the truncated cone 27 of the base frame 21. It is to be understood, of course, that the upper surface of the annulus 32 and the uppermost plane of the truncated cone 27 of the base frame 21 are co-planar when there is no load on the device whatsoever. The provision of the annulus 32 with its flat upper surface permits the reception on the annulus of the auxiliary frame of any standard size of automobile wheel, see Fig. 3 of the drawings. It is to be appreciated that the weight of the automobile wheel when placed upon the auxiliary frame will depress the same against the tension of the springs 36 and thus lower the auxiliary frame to the point where the inner periphery 41 of the automobile wheel 42 will engage and rest upon the truncated cone 27 of the base frame 21, as indicated by the dot and dash line 43 of Fig. 1 of the drawings.

As particularly illustrated in Figs. 2 and 3 of the accompanying drawings, my improved automobile wheel balancer is provided with a spirit level, generally designated by the numeral 46, which is detachably mounted by means of suitable screws 47 within a recess 48 of the truncated cone portion 27 of the base frame with the upper surface of the casing 49 of the spirit level 36 co-planar with the uppermost plane of the truncated cone portion 27 of the base frame 21. Any standard type of spirit level can be employed in my combination, such as a glass tube containing alcohol or ether with a movable bubble, indicated by the reference numeral 50 in Fig. 3 of the drawings, which when in the center of the tube indicates horizontalness.

When any given automobile wheel is to be balanced and is placed upon the annulus 32 of the auxiliary frame 31 of my improved balancer, the weight of the wheel, as stated above, will lower the auxiliary frame until the inner periphery of the hub of the automobile wheel engages and rests upon the truncated cone portion 27 of the base frame. The weight of the wheel is then, of course, applied to the base frame and since such base frame 21 is movably mounted on the standard 11 through the needle bearing 16, the bubble 50 of the spirit level will move from its centered position if the automobile wheel resting on the base frame is out of balance. The operator then proceeds in the normal manner by laying small weights at various points on the automobile wheel to bring the bubble 50 of the spirit level back to its centered position. The operator, of course, does not fasten the weights to the automobile rim during this operation but merely delineates markings on the automobile wheel for the indicated positions of the weights which are thereafter fastened to the rim of the automobile, as is customary.

It is to be especially noted that no extrinsic or extraneous equipment or devices, such as electric motors, drive shafts, and the like, are required for the successful operation of my improved wheel balancer as it is a complete operative unit in and of itself. Moreover, there is no need whatever of applying any motion either to the balancer, per se, or to the automobile wheel when mounted thereon to effect dynamic balancing of the wheel inasmuch as upon static balancing of each wheel with my device the wheels are also dynamically balanced. The components of downwardly directed forces, by reason of the placement of an automobile wheel on the annulus 32 of auxiliary frame 31, are evenly distributed about the periphery of truncated cone 27 of the base frame 21 in a single plane at the juncture of the inner periphery of the hub of the wheel being balanced and the periphery of the cone 27. It is further to be especially observed that the construction of my improved balancer, particularly the provision of the needle bearing 16, affords a durable device capable of use for an appreciably period of time. I have successfully employed my wheel balancer for the past six weeks in connection with substantially all types of automobile wheels presently in use, and have found that the wheel, in every instance, can be brought to static equilibrium or in static as well as dynamic balance in a relatively short time and requires only a single operator.

It is to be understood that the appended claim is to be accorded a range of equivalents commensurate in scope with the advance made over the prior art.

I claim:

In an automobile wheel balancer, a standard, a base frame universally mounted on said standard for universal tilting with respect thereto; said base frame comprising a body including a cylindrical portion and an overlying truncated cone portion; said truncated cone portion having its uppermost plane normally disposed horizontally with no load on the balancer, an annular flange on said cylindrical portion; said flange having a plurality of circumferentially spaced openings therein, a plurality of sockets depending from said flange in alignment with the openings thereof, a spirit level mounted on said cone portion with the level disposed in the uppermost plane thereof so as to be centered with no load on the balancer, and an auxiliary frame movably mounted on said base frame for movement toward and away from said base frame flange; said auxiliary frame consisting of a ring surrounding said cone portion of said base frame and having a flat upper surface disposed normally co-planar with the uppermost plane of said cone portion with no load on said ring; said ring having a plurality of circumferentially spaced threaded openings therein in alignment with said sockets, a rod removably secured to each of said threaded openings of said ring and extending through said flange openings into said sockets, and a spring coiled about each of said rods and confined between said base frame flange and said ring to support said ring above said flange; said spring permitting depression of said ring toward said flange when a load is placed on the upper surface of said ring to bring the load into engagement with the cone portion of said base frame and thereby universally tilt said base frame if the load is statically unbalanced and thus move the level away from center, the base frame and the level being adapted to be returned to initial positions upon static balancing of the load.

CECIL B. ROGERS.

REFERENCES CITED

The following references are of record in the file of this patent:

UNITED STATES PATENTS

| Number | Name | Date |
|---|---|---|
| 1,354,217 | Schneider | Sept. 28, 1920 |
| 1,389,533 | Sackett | Aug. 30, 1921 |
| 1,701,464 | Kraft | Feb. 5, 1929 |
| 2,080,939 | Taylor | May 18, 1937 |
| 2,289,514 | Mastney et al. | July 14, 1942 |
| 2,412,852 | Wood | Dec. 17, 1946 |
| 2,461,591 | Currier | Feb. 15, 1949 |
| 2,462,266 | Howard | Feb. 22, 1949 |